United States Patent
Tanabe et al.

(10) Patent No.: US 9,222,464 B2
(45) Date of Patent: Dec. 29, 2015

(54) CONTROLLER FOR WIND TURBINE GENERATOR, WIND TURBINE GENERATOR, AND METHOD OF CONTROLLING WIND TURBINE GENERATOR

(75) Inventors: Yoshihiro Tanabe, Tokyo (JP); Tomohiro Numajiri, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 934 days.

(21) Appl. No.: 13/117,179

(22) Filed: May 27, 2011

(65) Prior Publication Data

US 2012/0211982 A1    Aug. 23, 2012

Related U.S. Application Data

(63) Continuation of application No. PCT/JP2011/054044, filed on Feb. 23, 2011.

(51) Int. Cl.
*H02P 9/04* (2006.01)
*F03D 7/02* (2006.01)

(52) U.S. Cl.
CPC ............ *F03D 7/0272* (2013.01); *F03D 7/0292* (2013.01); *F05B 2270/1014* (2013.01);
(Continued)

(58) Field of Classification Search
CPC ....... F03D 7/02; F03D 7/0264; F03D 7/0272; F03D 7/0288; F03D 7/04; F03D 7/042; F05B 2270/20; F05B 2270/335; F05B 2270/1014; F05B 2270/1032; F05B 2270/3201; Y02E 10/72; Y02E 10/723
USPC ...................................... 700/287; 290/44, 55
See application file for complete search history.

(56) References Cited

U.S. PATENT DOCUMENTS 6,726,839 B2 *  4/2004  Taylor, Jr. .................. 210/198.1
6,809,431 B1 * 10/2004  Schippmann .................... 290/55
(Continued)

FOREIGN PATENT DOCUMENTS

CN    101042111 A    9/2007
CN    101169103 A    4/2008
(Continued)

OTHER PUBLICATIONS

Decision to Grant for corresponding Japanese Patent Application No. 2011-523231, which issued on Jan. 22, 2013.
(Continued)

*Primary Examiner* — Charles Kasenge
(74) *Attorney, Agent, or Firm* — Kanesaka Berner & Partners LLP

(57) ABSTRACT

If blades have been struck by wind that has reached a power reduction start wind speed that is lower than a conventional cut-out wind speed at which torque acting on a main shaft reaches the torque limit, a wind turbine generator performs torque reduction control for causing the change in the torque when wind speed is higher than the power reduction start wind speed to be different from change in the torque when wind speed is lower than the power reduction start wind speed so as to prevent the torque from exceeding the torque limit at the conventional cut-out wind speed. For example, if the wind striking the blades reaches the power reduction start wind speed, the wind turbine generator sets the slope of change in torque lower than that before the power reduction start wind speed is reached. Accordingly, the wind turbine generator can reduce the load acting on a device and suppress a reduction in power even if the blades are struck by strong wind.

5 Claims, 6 Drawing Sheets

(52) U.S. Cl.
CPC ..... *F05B2270/1032* (2013.01); *F05B 2270/20* (2013.01); *F05B 2270/3201* (2013.01); *F05B 2270/335* (2013.01); *Y02E 10/723* (2013.01)

(56) References Cited

U.S. PATENT DOCUMENTS

| | | | |
|---|---|---|---|
| 6,940,185 B2* | 9/2005 | Andersen et al. | 290/44 |
| 7,002,259 B2* | 2/2006 | Howes et al. | 290/4 C |
| 7,095,128 B2* | 8/2006 | Canini et al. | 290/44 |
| 7,352,075 B2* | 4/2008 | Willey et al. | 290/44 |
| 7,476,985 B2* | 1/2009 | Llorente Gonzalez | 290/44 |
| 7,629,702 B2* | 12/2009 | Schubert | 290/44 |
| 7,667,343 B2* | 2/2010 | Oohara et al. | 290/44 |
| 7,750,490 B2* | 7/2010 | Scholte-Wassink | 290/44 |
| 7,763,989 B2* | 7/2010 | Kinzie et al. | 290/44 |
| 7,898,100 B2* | 3/2011 | Andersen et al. | 290/44 |
| 7,919,880 B2* | 4/2011 | Nielsen et al. | 290/44 |
| 8,013,460 B2* | 9/2011 | Kinzie et al. | 290/44 |
| 8,025,476 B2* | 9/2011 | Zheng et al. | 415/1 |
| 8,128,362 B2* | 3/2012 | Andersen et al. | 416/1 |
| 8,203,229 B2* | 6/2012 | Stone | 290/55 |
| 8,362,633 B2* | 1/2013 | Tsutsumi et al. | 290/44 |
| 8,471,396 B2* | 6/2013 | Roddier et al. | 290/44 |
| 2006/0002793 A1* | 1/2006 | Yoshida | 416/11 |
| 2007/0216166 A1* | 9/2007 | Schubert | 290/55 |
| 2009/0218818 A1* | 9/2009 | Cardinal et al. | 290/44 |
| 2010/0038909 A1* | 2/2010 | Andersen et al. | 290/44 |
| 2010/0040468 A1* | 2/2010 | Andersen et al. | 416/1 |
| 2010/0060001 A1* | 3/2010 | Gabrys | 290/44 |
| 2010/0133817 A1* | 6/2010 | Kinzie et al. | 290/44 |
| 2010/0135789 A1* | 6/2010 | Zheng et al. | 416/1 |
| 2011/0006527 A1* | 1/2011 | Kinzie et al. | 290/44 |
| 2011/0031748 A1 | 2/2011 | Arinaga et al. | |
| 2011/0037264 A1* | 2/2011 | Roddier et al. | 290/44 |
| 2011/0133453 A1* | 6/2011 | Merswolke et al. | 290/44 |

FOREIGN PATENT DOCUMENTS

| | | |
|---|---|---|
| DE | 19532409 B4 | 5/2005 |
| EP | 0223729 A1 | 5/1987 |
| EP | 0223731 A1 | 5/1987 |
| EP | 0847496 | 6/1998 |
| EP | 1626175 A1 | 2/2006 |
| JP | 2007291976 A | 11/2007 |
| JP | 4494813 B2 | 6/2010 |
| NZ | 316943 | 11/1998 |
| WO | 9709531 A1 | 3/1997 |
| WO | 2011016278 A1 | 2/2011 |

OTHER PUBLICATIONS

Notice of Allowance corresponding to KR 2011-7012476 dated Jan. 10, 2013.
Office Action for Canadian Patent Application No. 2741389 issued Mar. 22, 2013.
International Search Report for PCT/JP2011/054044, mailed May 31, 2011.
Office Action mailed Sep. 3, 2014, corresponding to Chinese patent application No. 201180000371.4.
Extended European Search Report mailed Jan. 26, 2015, corresponding to European patent application No. 11721219.1.
Notice of Allowance issued Mar. 20, 2015, corresponding to Chinese patent application No. 201180000371.4.

* cited by examiner

CONTROLLER FOR WIND TURBINE GENERATOR, WIND TURBINE GENERATOR, AND METHOD OF CONTROLLING WIND TURBINE GENERATOR

CROSS REFERENCE TO RELATED APPLICATIONS

This is a continuation of International Application PCT/JP2011/054044, with an international filing date of Feb. 23, 2011, which is hereby incorporated by reference herein in its entirety.

TECHNICAL FIELD

The present invention relates to a controller for a wind turbine generator, a wind turbine generator, and a method of controlling a wind turbine generator.

BACKGROUND ART

In a wind turbine generator, a rotor having blades rotates due to being struck by wind, and a generator coupled to the rotor via a main shaft generates electricity based on the rotation of the rotor. Due to the rotation of the rotor, a load according to the rotation acts on devices such as the main shaft and gear box of the wind turbine generator. For this reason, in order to prevent the load acting on devices such as the main shaft and gear box from exceeding a determined design load in the wind turbine generator, generation of electricity is stopped when speed of wind reaches a predetermined wind speed (cut-out wind speed).

PTL 1 discloses technology for reducing power by lowering the rotational speed of the rotor if the wind striking the wind turbine generator has reached a wind speed that causes wear due to overload.

CITATION LIST

Patent Literature

{PTL 1}
EP Patent No. 0847496

SUMMARY OF INVENTION

Technical Problem

However, in the technology disclosed in PTL 1, although the load acting on devices can be reduced when the wind is strong, the power is accordingly reduced, and therefore the total amount of electricity generated per year decreases as the frequency with which a strong wind blows increases.

The present invention has been achieved in light of such a situation, and an object thereof is to provide a controller for a wind turbine generator, a wind turbine generator, and a method of controlling a wind turbine generator that can reduce the load acting on a device and suppress a reduction in power even in the case where the blades are struck by strong wind.

Solution to Problem

In order to solve the above-described problems, a controller for a wind turbine generator, a wind turbine generator, and a method of controlling a wind turbine generator of the present invention employ the following solutions.

Specifically, a controller for a wind turbine generator according to the present invention is a controller for a wind turbine generator in which a rotor having a blade rotates due to being struck by wind, and a generator coupled to the rotor via a main shaft generates electricity based on the rotation of the rotor, the controller including: a power control unit that, in a case where the blade has been struck by wind that has reached a predetermined second wind speed that is lower than a first wind speed at which torque acting on the main shaft reaches a limit value at which the possibility of causing wear in a device exists, performs control for causing change in the torque when wind speed is higher than the second wind speed to be different from change in the torque when wind speed is lower than the second wind speed so as to prevent the torque from exceeding the limit value at the first wind speed.

According to the present invention, in a wind turbine generator in which a rotor having blades rotates due to being struck by wind, and a generator coupled to the rotor via a main shaft generates electricity based on the rotation of the rotor, the torque acting on the main shaft is controlled.

Note that the torque acting on the main shaft increases as the speed of wind striking the blades increases, and the torque has a limit value at which there is the possibility of causing wear in a device. Besides the main shaft, examples of the above-described device include a gear box.

In view of this, in the case where the blades have been struck by wind that has reached the predetermined second wind speed that is lower than the first wind speed at which the torque acting on the main shaft reaches the limit value, the power control unit performs control for causing change in the torque when wind speed is higher than the first wind speed to be different from change in the torque when wind speed is lower than the second wind speed so as to prevent the torque from exceeding the limit value at the first wind speed.

Conventionally, in the case where the blades are struck by wind whose wind speed is the first wind speed at which the torque exceeds the limit value, the generation of energy by the generator is stopped in order to prevent wear in a device, but in the present invention, the control performed by the power control unit enables continuing the generation of energy by the generator even if the first wind speed is exceeded.

Accordingly, the present invention can reduce the load acting on a device and suppress a reduction in power even if the blades are struck by strong wind.

Also, a controller for a wind turbine generator according to the present invention is a controller for a wind turbine generator in which a rotor having a blade rotates due to being struck by wind, and a generator coupled to the rotor via a main shaft generates electricity based on the rotation of the rotor, the controller including: a power control unit that, in a case where the blade has been struck by wind that has reached a first wind speed at which torque acting on the main shaft reaches a limit value at which the possibility of causing wear in a device exists, performs control for causing change in the torque when wind speed is higher than the first wind speed to be different from change in the torque when wind speed is lower than the first wind speed so as to prevent the torque from exceeding the limit value at the first wind speed.

In the present invention, in the case where the blades have been struck by wind that has reached the first wind speed at which the torque acting on the main shaft reaches the limit value, the power control unit performs control for causing change in the torque when wind speed is higher than the first wind speed to be different from change in the torque when wind speed is lower than the first wind speed so as to prevent the torque from exceeding the limit value at the first wind speed.

Accordingly, the present invention can reduce the load acting on a device and suppress a reduction in power even if the blades are struck by strong wind.

Also, in the above-described configuration, it is preferable that the controller for a wind turbine generator includes: a pitch angle control unit that, in a case where the control is being performed by the power control unit, controls a pitch angle of the blade so as to keep a rotational speed of the rotor constant.

When the power control unit performs the above-described control, the rotation of the rotor speeds up due to the reduction of the load on the generator. For this reason, rotor control needs to be performed along with the above-described control in the wind turbine generator. In view of this, according to the present invention, in the case where the above-described control has been performed by the power control unit, the pitch angle of the blades is controlled such that the rotor rotational speed is kept constant (e.g., constant at the rated rotational speed), thus enabling preventing a rise in the rotor rotational speed.

Also, in the above-described configuration, it is preferable that in a case where wind striking the blade reaches the second wind speed, the power control unit sets a slope of change in the torque lower than that before wind speed reaches the second wind speed.

According to the present invention, in the case where the wind striking the blades reaches the second wind speed, the slope of change in the torque acting on the main shaft is set lower than that before the second wind speed is reached, thus enabling more reliably preventing the torque from exceeding the limit value at the first wind speed.

Also, in the above-described configuration, it is preferable that in a case where wind striking the blade reaches the first wind speed, the power control unit lowers the torque by a predetermined amount, and thereafter increases the torque according to increase in wind speed.

According to the present invention, in the case where the wind striking the blades reaches the first wind speed, the torque acting on the main shaft is lowered by a predetermined amount, and thereafter the torque is increased according to the increase in wind speed, thus enabling obtaining more power from the generator.

Furthermore, a wind turbine generator according to the present invention includes: a rotor that has a blade and rotates due to being struck by wind; a generator that is coupled to the rotor via a main shaft and generates electricity based on the rotation of the rotor; and the controller according to a configuration described above.

The present invention enables reducing the load acting on a device and suppressing a reduction in power even if the blades are struck by strong wind.

Also, a method of controlling a wind turbine generator according to the present invention is a method of controlling a wind turbine generator in which a rotor having a blade rotates due to being struck by wind, and a generator coupled to the rotor via a main shaft generates electricity based on the rotation of the rotor, the method including: a first step of, in a case where the blade has been struck by wind that has reached a predetermined second wind speed that is lower than a first wind speed at which torque acting on the main shaft reaches a limit value at which the possibility of causing wear in a device exists, performing control for causing change in the torque when wind speed is higher than the second wind speed to be different from change in the torque when wind speed is lower than the second wind speed so as to prevent the torque from exceeding the limit value at the first wind speed; and a second step of stopping generation of electricity performed by the generator in a case where the wind speed increases further and reaches a third wind speed at which the torque reaches the limit value.

The present invention enables reducing the load acting on a device and suppressing a reduction in power even if the blades are struck by strong wind.

Also, a method of controlling a wind turbine generator according to the present invention is a method of controlling a wind turbine generator in which a rotor having a blade rotates due to being struck by wind, and a generator coupled to the rotor via a main shaft generates electricity based on the rotation of the rotor, the method including: a first step of, in a case where the blade has been struck by wind that has reached a first wind speed at which torque acting on the main shaft reaches a limit value at which the possibility of causing wear in a device exists, performing control for causing change in the torque when wind speed is higher than the first wind speed to be different from change in the torque when wind speed is lower than the first wind speed so as to prevent the torque from exceeding the limit value at the first wind speed; and a second step of stopping generation of electricity performed by the generator in a case where the wind speed increases further and reaches a third wind speed at which the torque reaches the limit value.

The present invention enables reducing the load acting on a device and suppressing a reduction in power even if the blades are struck by strong wind.

Advantageous Effects of Invention

The present invention causes a superior effect of enabling reducing the load acting on a device and suppressing a reduction in power even if the blades are struck by strong wind.

BRIEF DESCRIPTION OF DRAWINGS

FIG. 3(A) shows change in power of the wind turbine generator with respect to wind speed, and FIG. 3(B) shows change in torque acting on a main shaft with respect to wind speed.

FIG. 4(A) shows change in rotor rotational speed with respect to wind speed, and FIG. 4(B) shows change in blade pitch angle with respect to wind speed.

FIG. 6(A) shows change in the power of the wind turbine generator with respect to wind speed, and FIG. 6(B) shows change in torque acting on a main shaft with respect to wind speed.

DESCRIPTION OF EMBODIMENTS

Below is a description of embodiments of a controller for a wind turbine generator, a wind turbine generator, and a method of controlling a wind turbine generator according to the present invention, with reference to the drawings.

The following describes a first embodiment of the present invention.

Figure 1:
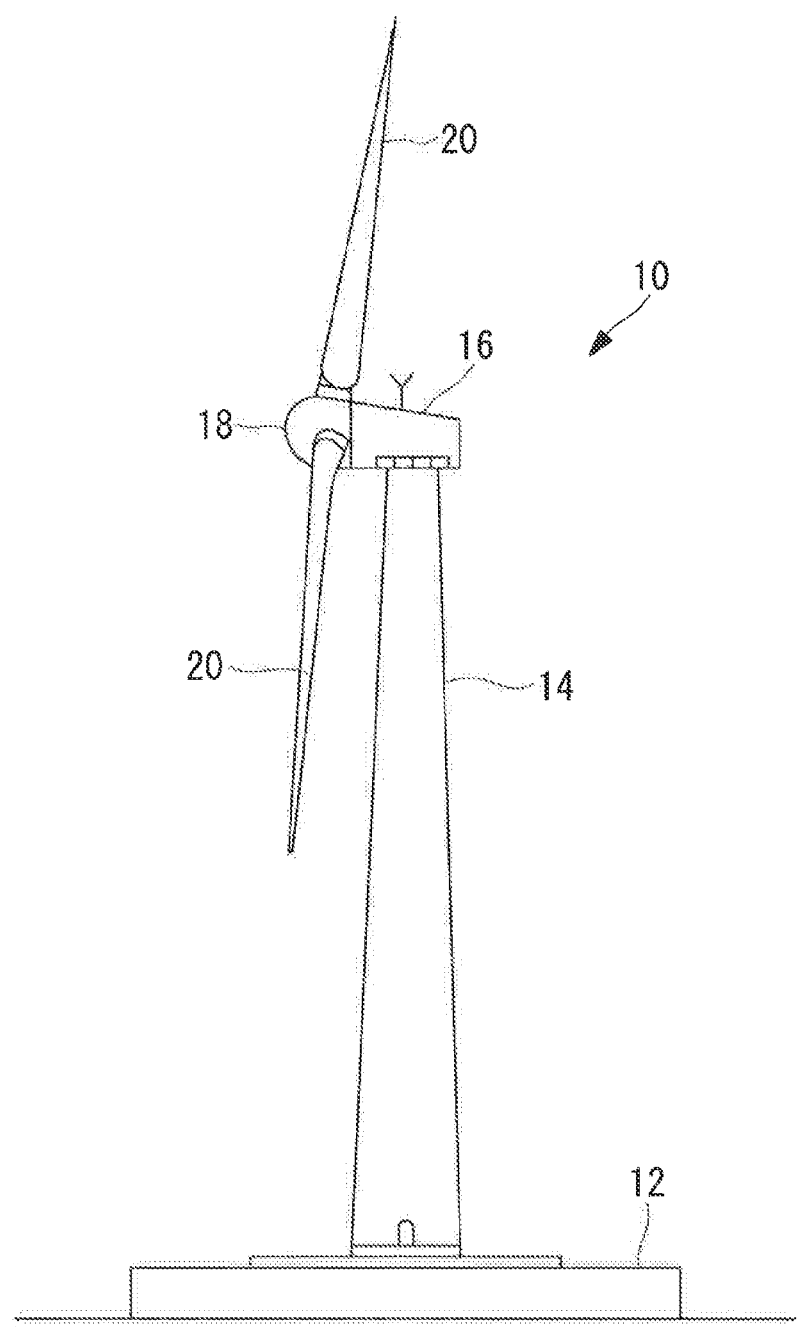
FIG. 1 is an external view of a wind turbine generator according to a first embodiment.

FIG. 1 is an external view of a wind turbine generator 10 according to the first embodiment.

The wind turbine generator 10 shown in FIG. 1 is a so-called variable-speed wind turbine and has a tower 14 provided upright on a foundation 12, a nacelle 16 disposed on the upper end of the tower 14, and a rotor 18 provided on the nacelle 16 so as to be able to rotate around a substantially horizontal axis.

A plurality of blades 20 (e.g., three in the first embodiment) are attached to the rotor 18 in a radial configuration around the rotation shaft line of the rotor 18. Accordingly, the force of wind striking the blades 20 from the rotation shaft line direction of the rotor 18 is converted into driving force that causes the rotor 18 to rotate around the rotation shaft line. This driving force is converted into power by a generator 34 (see FIG. 2) coupled to the rotor 18 via a main shaft 30. Note that the blades 20 are coupled to the rotor 18 so as to be able to rotate in accordance with an operating condition, and the pitch angle of the blades 20 is variable.

The generator 34 includes a power converter configured by an inverter, a converter, and the like, and the power converter converts AC power output by the generator 34 into AC power suited to the frequency of a power system.

Figure 2:
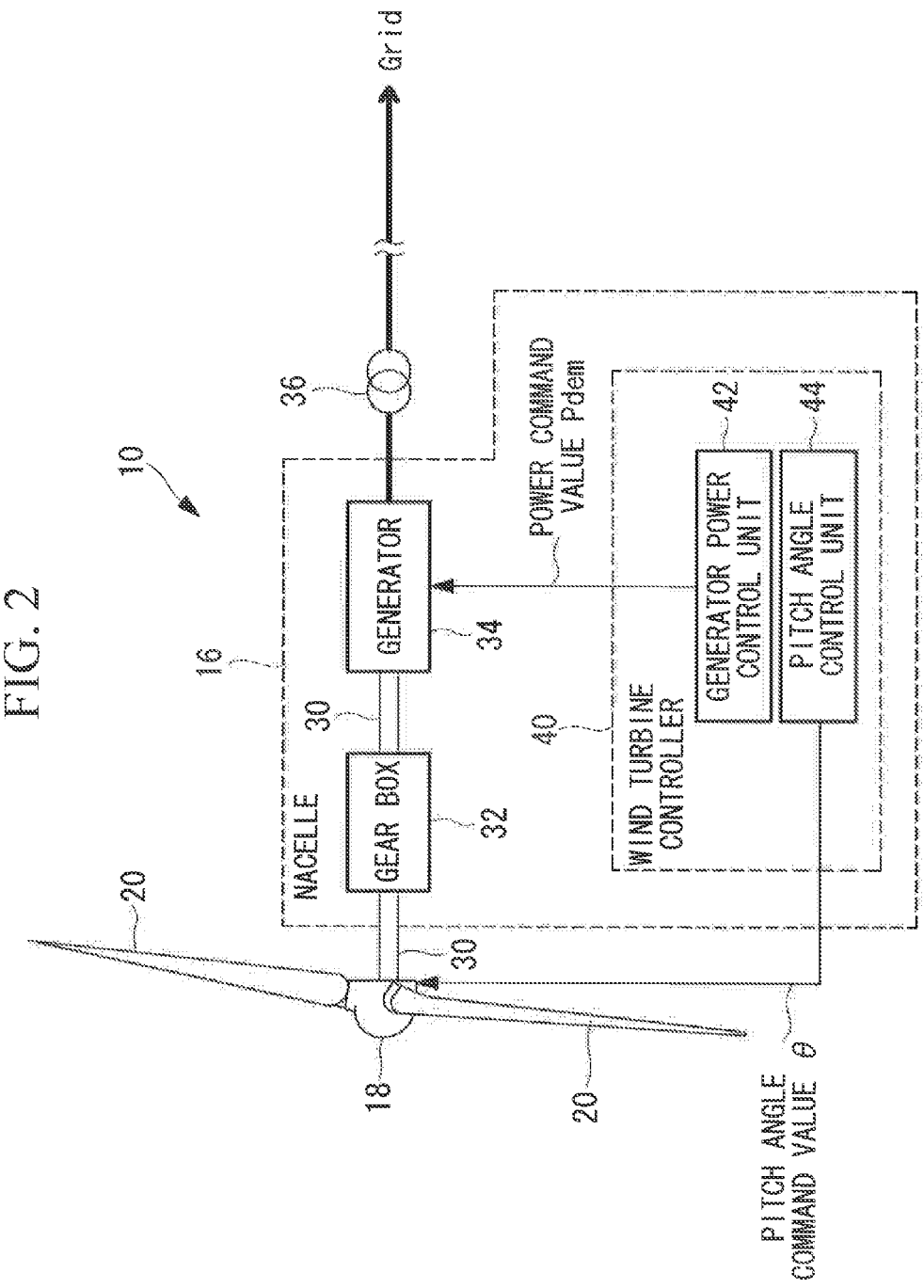
FIG. 2 is a diagram showing an electrical configuration of the wind turbine generator according to the first embodiment.

FIG. 2 is a schematic diagram showing an electrical configuration of the wind turbine generator 10 according to the first embodiment.

In the wind turbine generator 10, driving force is transmitted to the generator 34 via a gear box 32 that accelerates the rotational speed of the main shaft 30, and the generator 34 converts the driving force into power.

The wind turbine generator 10 is electrically connected to the power system (Grid) via a transformer 36, and the wind turbine generator 10 supplies the power converted from driving force by the generator 34 to the power system.

The wind turbine generator 10 is controlled by a wind turbine controller 40 located inside of the nacelle 16.

The wind turbine controller 40 includes a generator power control unit 42 and a pitch angle control unit 44.

The generator power control unit 42 generates a power command value Pdem for controlling the power of the generator 34, and outputs the power command value Pdem to the generator 34. The power command value Pdem is determined based on, for example, a power request from the power system, the current power of the generator 34, the rotational speed of the rotor 18, the pitch angle of the blades 20, and the wind speed.

Upon receiving the power command value Pdem, the generator 34 changes the power based on the power command value Pdem.

The pitch angle control unit 44 generates a pitch angle command value θ for controlling the pitch angle of the blades 20, and transmits the pitch angle command value θ to a pitch actuator (not shown) for changing the pitch angle, which is included in the rotor 18. The pitch angle command value θ is determined based on, for example, the current pitch angle, the speed of wind striking the blades 20, and the rotational speed of the rotor 18.

Upon receiving the pitch angle command value θ, the pitch actuator changes the pitch angle of the blades 20 based on the pitch angle command value θ.

Figure 3:
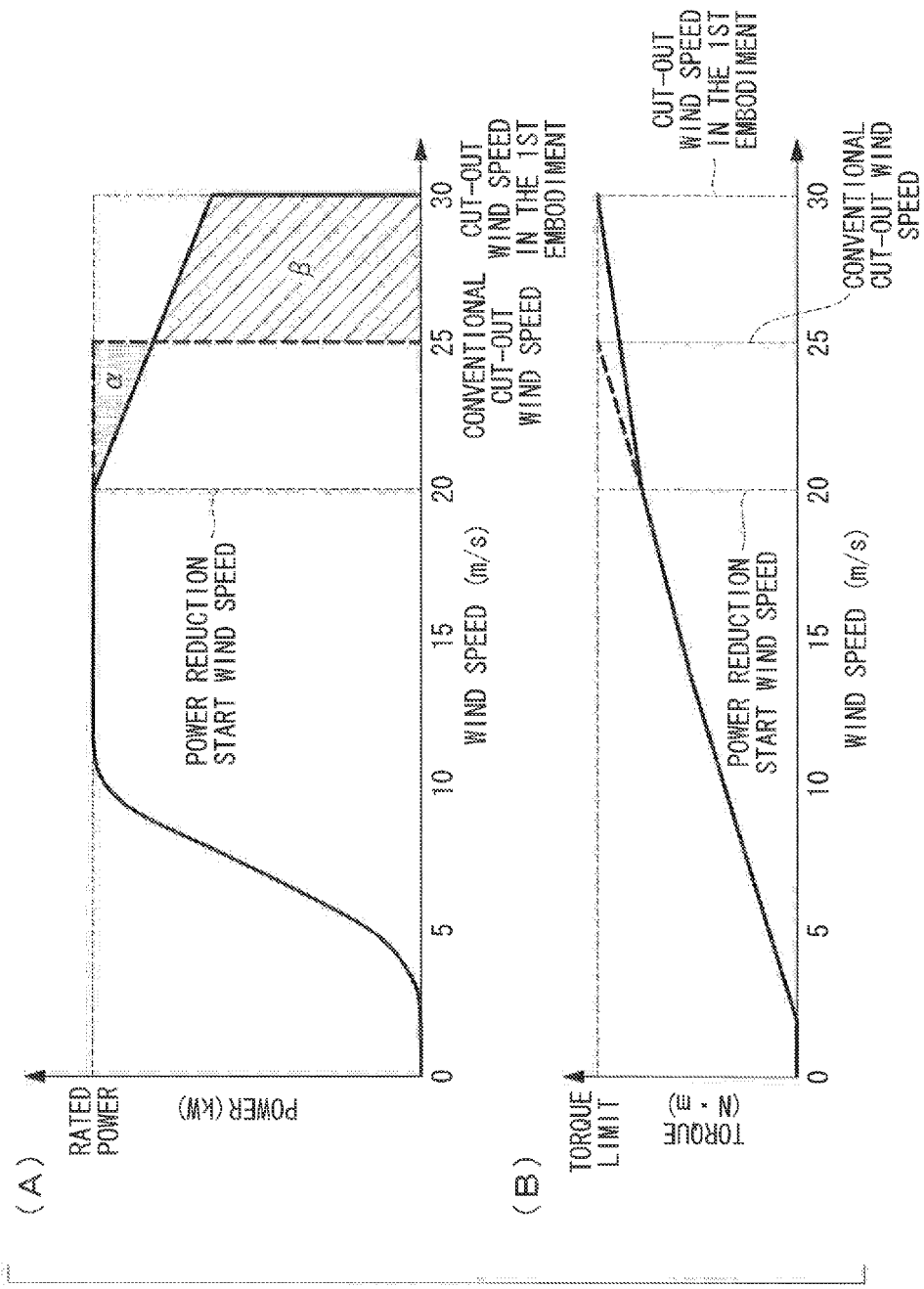
FIGS. 3(A) and 3(B) are graphs showing types of change with respect to wind speed in the wind turbine generator according to the first embodiment, where

FIGS. 3(A) and 3(B) are graphs showing types of change with respect to wind speed in the wind turbine generator 10 according to the first embodiment. In the following description, "wind speed" refers to mean wind speed (e.g., the mean over 10 minutes).

FIG. 3(A) is a graph showing change in the power of the wind turbine generator 10 with respect to wind speed. In FIG. 3(A), the solid line indicates change in the power of the wind turbine generator 10 of the first embodiment with respect to wind speed, and the broken line indicates change in the power of a conventional wind turbine generator with respect to wind speed.

FIG. 3(B) shows change in the torque acting on the main shaft 30 with respect to wind speed. Note that in FIG. 3(B), the solid line indicates change in the torque of the wind turbine generator 10 of the first embodiment with respect to wind speed, and the broken line indicates change in the torque of a conventional wind turbine generator with respect to wind speed. It should also be noted that although the solid line and the broken line shown in FIG. 3(B) change linearly due to being planning lines, in actuality variation occurs.

As shown in FIG. 3(A), the power generated by the generator 34 in the wind turbine generator 10 increases as the wind speed increases. Upon reaching the rated power, the power generated by the generator 34 is kept at the rated power.

In the conventional wind turbine generator, when the wind striking the blades 20 reaches a predetermined wind speed (e.g., 25 m/s, which is hereinafter referred to as the "cut-out wind speed") while the power generated by generator is kept at the rated power, the wind turbine controller 40 outputs a power command value Pdem for setting the power to 0 kW, and generation of electricity is stopped as shown by the broken line FIG. 3(A).

The load (torque) acting on the main shaft 30 increases as the wind speed increases, and thus the above is performed in order to prevent this load from exceeding the designed load.

In view of this, the cut-out wind speed at which generation of electricity performed by the wind turbine generator 10 is stopped is, as shown in FIG. 3(B), set to a wind speed at which the torque acting on the main shaft 30 due to wind reaches a limit value (hereinafter, referred to as the "torque limit") at which there is the possibility of causing wear in a device (the main shaft 30, the gear box 34, or the like).

However, there is demand for obtaining more amount of electricity (total amount of generation of electricity per year) from the wind turbine generator 10, and as one method of obtaining more amount of generation of electricity, it is conceivable to set the cut-out wind speed, at which the wind turbine generator 10 is stopped, to a wind speed that is higher than the conventional cut-out wind speed.

In view of this, in the wind turbine generator 10 according to the first embodiment, if the blades 20 have been struck by wind that has reached a predetermined wind speed (hereinafter, referred to as the "power reduction start wind speed") that is lower than the conventional cut-out wind speed, control (hereinafter, referred to as "torque reduction control") is performed for causing the change in torque when wind speed is higher than the power reduction start wind speed to be different from change in the torque when wind speed is lower than the power reduction start wind speed so as to prevent the torque from exceeding the torque limit value at the conventional cut-out wind speed.

In other words, the wind turbine generator 10 performs control for reducing (suppressing) an increase in torque with respect to an increase in wind speed, in a wind speed region that is higher than the rated wind speed and furthermore lower than the cut-out wind speed. Note that the power reduction start wind speed is included in this wind speed region.

Specifically, with the wind turbine generator 10 of the first embodiment, when the wind striking the blades 20 reaches the power reduction start wind speed, the slope of the change in torque is set smaller than that in the case of a wind speed lower than the power reduction start wind speed, as shown by the solid line in FIG. 3(B). Accordingly, when the wind striking the blades 20 reaches the power reduction start wind speed, and torque reduction control is performed, the power of the wind turbine generator 10 begins to be reduced so as to be lower than or equal to the rated power, as shown by the solid line in FIG. 3(A).

Also, as shown by the solid line in FIG. 3(B), due to performing torque reduction control, the torque does not reach the torque limit even at a wind speed higher than the conventional cut-out wind speed. For this reason, even if the wind striking the blades 20 reaches a wind speed exceeding the conventional cut-out wind speed, the power of the wind turbine generator 10 falls to a power less than or equal to the rated power, but generation of electricity can be continued, and it is possible to obtain more amount of electricity than a conventional wind turbine generator.

Note that if the wind speed has reached the power reduction start wind speed, the generator power control unit 42 transmits, to the generator 34, a power command value Pdem for reducing the power of the generator 34. Upon receiving the power command value Pdem, the generator 34 reduces the magnitude of the torque by controlling the magnitude of the magnetic field generated by the field system, in accordance with the power command value Pdem.

Here, the power reduction start wind speed need only be a wind speed lower than the conventional cut-out wind speed. As one example, if the conventional cut-out wind speed is 25 m/s, the power reduction start wind speed is 20 m/s.

The reason for this is that wind speed always has a certain degree of fluctuation range, and in the exemplary case where the wind speed is 25 m/s, the fluctuation range thereof is approximately a wind speed m/s in the low tens to a wind speed m/s in the low twenties, and therefore the torque acting on the main shaft 30 is prevented from exceeding the torque limit in the case where the instantaneous peak wind speed exceeds the conventional cut-out wind speed before torque reduction control is performed.

Also, with the wind turbine generator 10 of the first embodiment, the power is reduced so as to be lower than the rated power if the power reduction start wind speed has been reached, and therefore power corresponding to the region α in FIG. 3(A) is not generated, unlike the conventional wind turbine generator. However, with the wind turbine generator 10 of the first embodiment, the amount of power corresponding to the region β obtained by generation of electricity performed at a wind speed higher than the conventional cut-out wind speed is greater than the amount of power corresponding to the region α. For this reason, the wind turbine generator 10 of the first embodiment can obtain more amount of electricity than the conventional wind turbine generator.

Figure 4:
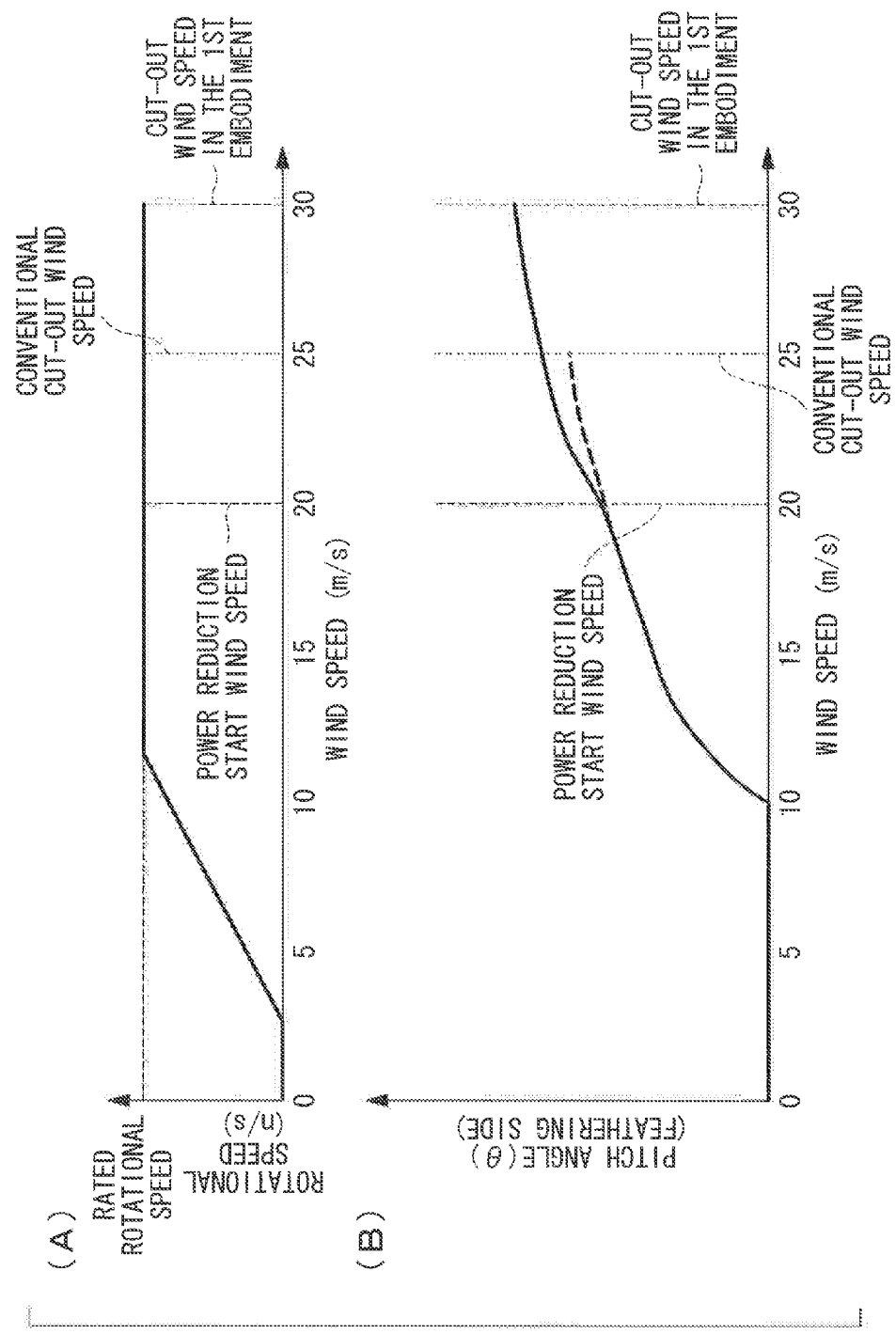
FIGS. 4(A) and 4(B) are graphs showing types of change with respect to wind speed in the wind turbine generator according to the first embodiment, where

FIG. 4(A) shows change in the rotational speed of the rotor 18 with respect to wind speed in the first embodiment, and FIG. 4(B) shows change in the pitch angle of the blades 20 with respect to wind speed. In FIG. 4(B), the solid line indicates change in pitch angle in the first embodiment with respect to wind speed, and the broken line indicates conventional change in pitch angle with respect to wind speed.

As shown in FIG. 4(A), the wind turbine generator 10 of the first embodiment controls the pitch angle of the blades 20 so as to keep the rotational speed of the rotor 18 constant irrespective of whether or not torque reduction control is performed. Note that as one example in the first embodiment, the rotational speed of the rotor 18 is kept at the rated rotational speed.

Figure 5:
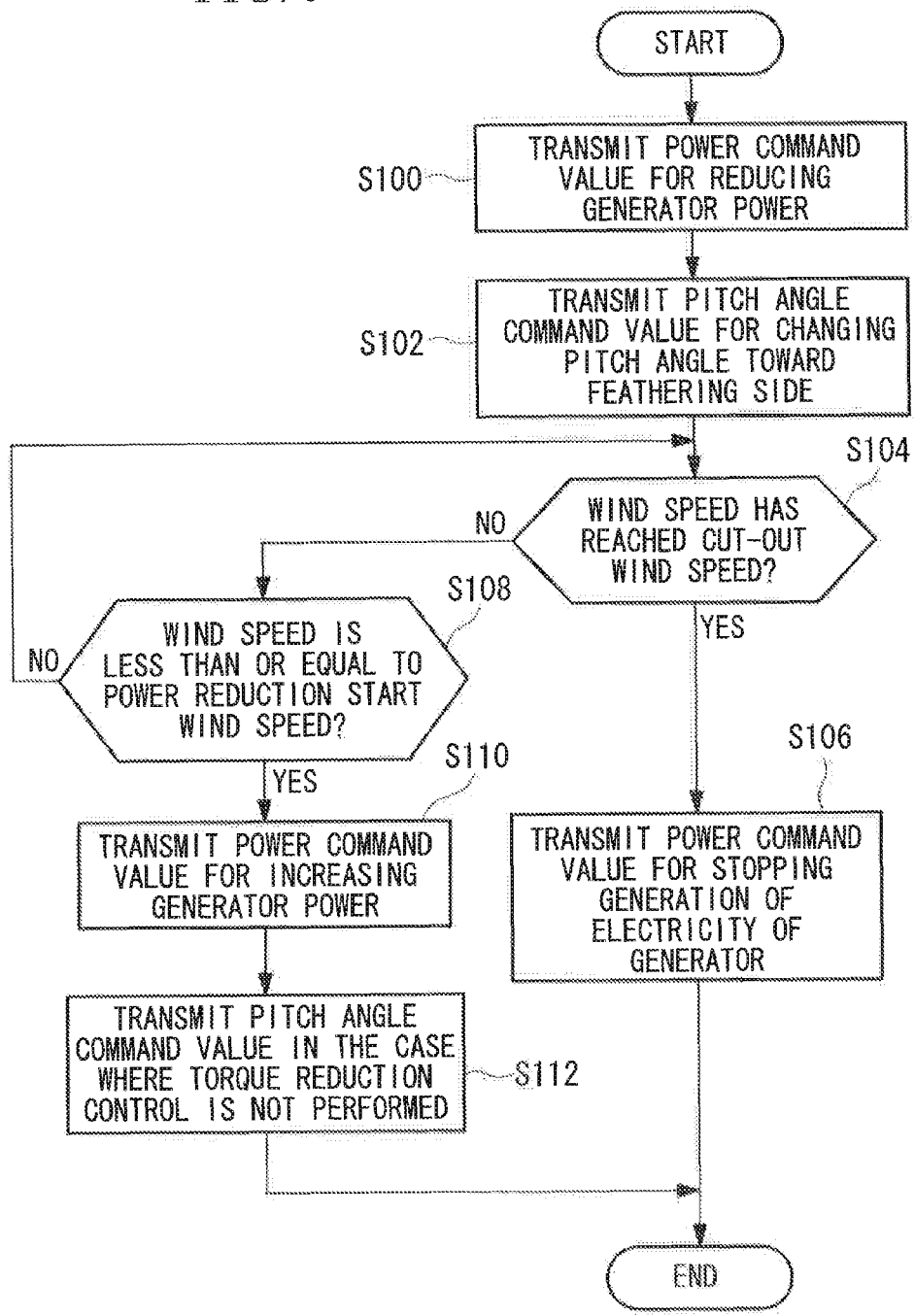
FIG. 5 is a flowchart showing a flow of torque reduction control processing including control with respect to pitch angle according to the first embodiment.

Next is a description of the flow of torque reduction control processing, which includes control with respect to the pitch angle, performed by the wind turbine controller 40 of the first embodiment, with reference to the flowchart shown in FIG. 5. Note that the torque reduction control processing is started when the wind speed of wind striking the blades 20 reaches the power reduction wind speed.

First, in step 100, the wind turbine controller 40 causes the generator power control unit 42 to output a power command value Pdem for reducing the power of the generator 34, as described above.

Accordingly, the torque acting on the main shaft 30 is reduced, and the load on the generator 34 decreases, and thus the rotational speed of the rotor 18 rises. However, since the rotational speed of the rotor 18 has already reached the rated rotational speed, it is not preferable that the rotational speed of the rotor 18 increases any further.

In view of this, in step S102, the rotational speed of the rotor 18 is prevented from exceeding the rated rotational speed, and the rotational speed is kept constant at the rated rotational speed. In order to achieve this, the wind turbine controller 40 causes the pitch angle control unit 44 to transmit, to the pitch actuator, a pitch angle command value θ for changing the pitch angle so as to be more toward the feathering side than the conventional pitch angle, as shown by the solid line in FIG. 4(B).

Upon receiving the pitch angle command value θ, the pitch actuator changes the pitch angle so as to be more toward the feathering side in accordance with the pitch angle command value θ, that is to say, decreases the pitch.

In this way, the wind turbine generator 10 of the first embodiment keeps the rotational speed of the rotor 18 at the rated rotational speed, thus enabling keeping the inertial force of the rotor 18 high and preventing an increase in torque.

In the next step 104, the wind speed increases further, a determination is made as to whether the wind speed has reached the cut-out wind speed (e.g., 30 m/s) of the first embodiment, the processing moves to step 106 in the case of an affirmative determination, and the processing moves to step 108 in the case of a negative determination. Note that the cut-out wind speed of the first embodiment is a wind speed higher than the conventional cut-out wind speed, and is a wind speed at which the torque acting on the main shaft 30 reaches the torque limit in the case where torque reduction control is being performed.

In step 106, the wind turbine controller 40 transmits, to the generator 34, a power command value Pdem for causing the generator power control unit 42 to stop generation of electricity. Upon receiving the power command value Pdem, the generator 34 stops generation of electricity, and torque reduction control is ended.

Along with this, the pitch angle control unit 44 may transmit, to the pitch actuator, a pitch angle command value θ for changing the pitch angle so as to be completely on the feathering side in order to cause the blades 20 to allow the wind to pass and stop the rotation of the rotor 18. Upon receiving the pitch angle command value θ, the pitch actuator changes the pitch angle to the feathering side in accordance with the pitch angle command value θ.

On the other hand, in step 108, a determination is made as to whether the wind striking the blades 20 is less than or equal to the power reduction start wind speed, the processing moves to step 110 in the case of an affirmative determination, and the processing moves to step 104 in the case of a negative determination.

In step 110, the wind turbine controller 40 transmits, to the generator 34, a power command value Pdem for causing the generator power control unit 42 to raise the power to the rated power.

Next, in step 112, the wind turbine controller 40 causes the pitch angle control unit 44 to transmit, to the pitch actuator, a pitch angle command value θ in the case where torque reduction control is not performed, and torque reduction control is ended.

As described above, with the wind turbine generator 10 of the first embodiment, if the blades 20 have been struck by wind that has reached a power reduction start wind speed that is lower than a conventional cut-out wind speed at which the torque acting on the main shaft 30 reaches the torque limit, torque reduction control is performed for causing change in the torque when wind speed is higher than the power reduction start wind speed to be different from change in the torque when wind speed is lower than the power reduction start wind speed so as to prevent the torque from exceeding the torque limit value at the conventional cut-out wind speed.

Specifically, with the wind turbine generator 10 of the first embodiment, if the wind striking the blades 20 reaches the power reduction start wind speed, the slope of change in the torque with respect to wind speed is set smaller than that before the power reduction start wind speed is reached.

After torque reduction control has started, if the wind speed increases further and reaches a wind speed at which the torque reaches the torque limit, the wind turbine generator 10 stops the generation of electricity performed by the generator 34.

Accordingly, the wind turbine generator 10 of the first embodiment can reduce the load acting on a device and suppress a reduction in power even if the blades 20 are struck by strong wind. Furthermore, since the wind turbine generator 10 of the first embodiment can reduce the load acting on a device, the device maximum load and fatigue strength are given leeway.

Note that with the wind turbine generator 10 of the first embodiment, if torque reduction control is being performed, the pitch angle of the blades 20 is controlled so as to keep the rotational speed of the rotor 18 constant, thus enabling preventing the rotational speed of the rotor 18 from increasing.

Second Embodiment

The following describes a second embodiment of the present invention.

Note that the configuration of a wind turbine generator 10 of the second embodiment is similar to the configuration of the wind turbine generator 10 of the first embodiment shown in FIGS. 1 and 2, and therefore a description of the configuration has been omitted.

Figure 6:
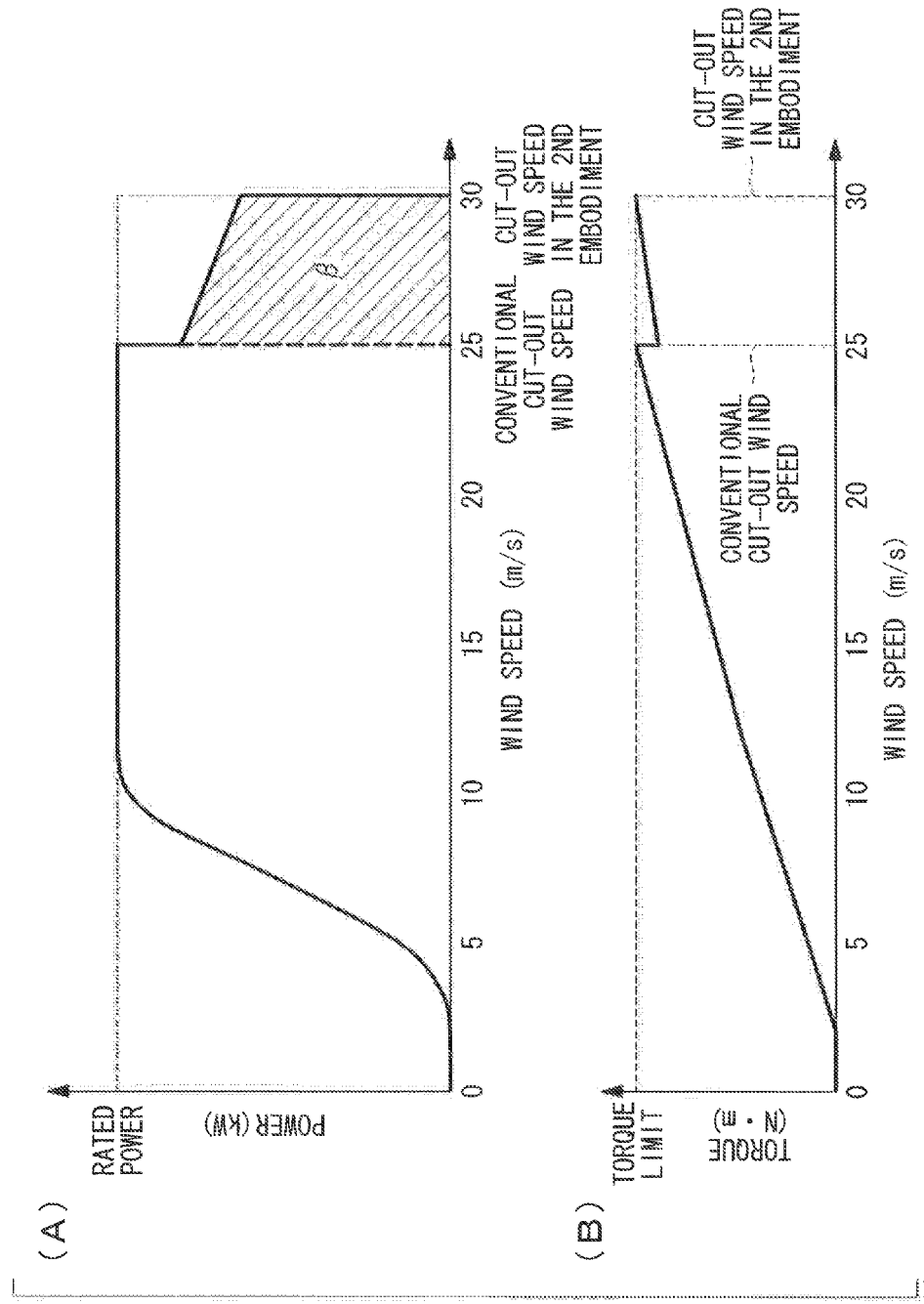
FIGS. 6(A) and 6(B) are graphs showing types of change with respect to wind speed in a wind turbine generator according to a second embodiment, where

FIGS. 6(A) and 6(B) are graphs showing types of change with respect to wind speed in the wind turbine generator 10 according to the second embodiment, where FIG. 6(A) shows change in the power of the wind turbine generator 10 with respect to wind speed, and FIG. 6(B) shows change in torque acting on the main shaft 30 with respect to wind speed.

If the wind striking the blades 20 reaches the conventional cut-out wind speed as shown in FIG. 6(B), the generator power control unit 42 of the wind turbine generator 10 of the second embodiment lowers the torque by a predetermined amount, and thereafter performs torque reduction control for increasing the torque in accordance with increase in the wind speed.

In order to perform such torque reduction control, if the wind striking the blades 20 reaches the conventional cut-out wind speed, the generator power control unit 42 outputs, to the generator 34, a power command value Pdem for steeply reducing the power of the generator 34 by a predetermined amount. Thereafter, the generator power control unit 42 outputs, to the generator 34, a power command value Pdem for gradually reducing the power.

Accordingly, with the wind turbine generator 10 of the second embodiment, as shown in FIG. 6(A), there is no decrease in generation of electricity corresponding to the region α shown in FIG. 3(A) of the first embodiment, thus enabling obtaining more power from the generator 34.

Note that also in the wind turbine generator 10 of the second embodiment, torque reduction control is performed in order to reduce the torque acting on the main shaft 30 and reduce the load on the generator 34, and thus the rotational speed of the rotor 18 increases. In view of this, the pitch angle control unit 44 of the second embodiment transmits, to the pitch actuator, a pitch angle command value θ for changing the pitch angle so as to be more toward the feathering side than the conventional pitch angle, as in the first embodiment.

Upon receiving the pitch angle command value θ, the pitch actuator changes the pitch angle toward the feathering side in accordance with the pitch angle command value θ, that is to say, decreases the pitch. Accordingly, the wind turbine generator 10 of the second embodiment keeps the rotational speed of the rotor 18 at the rated rotational speed, thus enabling keeping the inertial force of the rotor 18 high and preventing an increase in torque.

If the wind striking the blades 20 then reaches the cut-out wind speed of the second embodiment, which is higher than the conventional cut-out wind speed, the wind turbine generator 10 stops generation of electricity performed by the generator 34.

Although the present invention has been described using the above embodiments, the technical scope of the present invention is not limited to the scope disclosed in the above embodiments. Various variations and modifications can be made to the above embodiments without departing from the spirit of the invention, and all such variations and modifications are also encompassed in the technical scope of the present invention.

For example, although a configuration in which torque reduction control is performed only one time after the wind speed has reached the power reduction start wind speed is described in the first embodiment (after the wind speed has reached the conventional cut-out wind speed in the second embodiment), the present invention is not limited to this, and a configuration is possible in which torque reduction control is performed a plurality of times before the torque reaches the torque limit.

Also, although a configuration in which the torque is changed linearly after torque reduction control is described in the above embodiments, the present invention is not limited to this, and, for example, the torque may be changed curvilinearly so as to be asymptotic to the torque limit, or the torque may be changed gradually in a stepwise fashion.

REFERENCE SIGNS LIST 10 wind turbine generator
18 rotor
20 blade
30 main shaft
40 wind turbine controller 42 generator power control unit
44 pitch angle control unit

The invention claimed is:

1. A controller for a wind turbine generator in which a rotor having a blade rotates due to being struck by wind, a generator coupled to the rotor via a main shaft generates electricity based on the rotation of the rotor, and torque acting on the main shaft continues to increase as a striking wind speed that is a speed of wind striking the blade increases, the controller comprising:

a power control unit that controls power of the generator in accordance with the striking wind speed, wherein the power control unit is configured to start reducing the power of the generator to suppress an increase in the torque by making the power of the generator fall to a power less than or equal to a rated power in a case where the power of the generator has reached the rated power and has been kept at the rated power, and thereafter, when the striking wind speed increases continuously, the striking wind speed reaches a predetermined second wind speed that is lower than a first wind speed that is predetermined as a wind speed at which the torque reaches a limit value at which the possibility of causing wear in a device exists, and thereafter to stop generation of electricity by the generator in a case where the striking wind speed reaches a predetermined third wind speed that is higher than the first wind speed.

2. The controller for a wind turbine generator according to claim 1, comprising:

a pitch angle control unit that, in a case where the striking wind speed reaches the second wind speed, controls a pitch angle of the blade so as to keep a rotational speed of the rotor constant.

3. The controller for a wind turbine generator according to claim 1, wherein in a case where the striking wind speed reaches the second wind speed, the power control unit sets a slope of change in the torque lower than that before wind speed reaches the second wind speed.

4. A wind turbine generator including a blade, a rotor rotating due to being struck by wind, and a generator which is coupled to the rotor via a main shaft and generates electricity based on the rotation of the rotor, torque acting on the main shaft continuing to increase as a striking wind speed that is a speed of wind striking the blade increases, the wind turbine generator comprising the controller according to claim 1.

5. A method of controlling a wind turbine generator in which a rotor having a blade rotates due to being struck by wind, a generator coupled to the rotor via a main shaft generates electricity based on the rotation of the rotor, and torque acting on the main shaft continues to increase as a striking wind speed that is a speed of wind striking the blade increases, the method comprising:

in a case where the power of the generator has reached a rated power and has been kept at the rated power, and thereafter, when the striking wind speed increases continuously, the striking wind speed reaches a predetermined second wind speed that is lower than a first wind speed that is predetermined as a wind speed at which the torque reaches a limit value at which the possibility of causing wear in a device exists, starting reducing the power of the generator to suppress an increase in the torque by making the power of the generator fall to a power less than or equal to the rated power; and thereafter in a case where the striking wind speed reaches a predetermined third wind speed that is higher than the first wind speed, stopping generation of electricity by the generator.

* * * * *